United States Patent [19]

Jetter et al.

[11] 4,025,790

[45] May 24, 1977

[54] METHOD FOR SEPARATING ISOTOPES BY MEANS OF LASERS

[75] Inventors: Heinz Leonhard Jetter, Liederbach; Karl Gürs, Eschborn; Wolfgang Englisch, Kelkheim, all of Germany

[73] Assignee: URANIT Uran-Isotopentrennungs-GmbH, Julich, Germany

[22] Filed: Dec. 11, 1975

[21] Appl. No.: 639,890

[30] Foreign Application Priority Data

Dec. 11, 1974 Germany .................. 2458563

[52] U.S. Cl. .................. 250/284; 250/288; 250/423 P
[51] Int. Cl.² .................. H01J 39/34
[58] Field of Search .......... 250/281, 283, 284, 288, 250/393, 423 P, 423 R, 428, 429, 432, 435; 331/DIG. 1

[56] References Cited

UNITED STATES PATENTS

| 3,772,519 | 11/1973 | Levy et al. | 250/284 |
| 3,914,655 | 10/1975 | Dreyfus et al. | 250/423 X |
| 3,944,825 | 3/1976 | Levy et al. | 250/282 |

*Primary Examiner*—Eugene La Roche
*Attorney, Agent, or Firm*—Spencer & Kaye

[57] ABSTRACT

In a procedure for selectively separating the isotopes of a multi-isotopic element by forming a gas of isotopic compounds of the element, selectively exciting the molecules of one isotopic compound by application of laser radiation thereto, and separating the excited molecules from the other components of the gas by physical or chemical means, the efficiency of the separation is improved by passing the gas, prior to laser excitation, through a nozzle to cause it to undergo adiabatic expansion to form an undercooled gas stream, and applying the laser radiation to the gas stream.

23 Claims, 3 Drawing Figures

METHOD FOR SEPARATING ISOTOPES BY MEANS OF LASERS

BACKGROUND OF THE INVENTION

The present invention relates to a method for separating various isotopes of an element in which the molecules of the element in question form an isotopic compound gas and in which the molecules of the pure molecular gas or of the molecular gas mixed with an additional gas are selectively excited with the aid of a laser, the excited molecules being separated by either physical or chemical means.

It is known to effect the separation of isotopes by selective excitation with laser light, but it has not as yet been possible to develop a process based on this principle which could be used in large-scale operations. The presently actually employed separation processes, such as diffusion, centrifuging, etc., effect separation on the basis of the small difference in mass between the various isotopes. Since this difference in mass is very slight, the separation must be effected in numerous stages so as to achieve a sufficient concentration of the respective isotope. Thus, for example, it requires more than 1000 stages in the uranium enrichment process by diffusion to enrich the $U^{235}$ isotope, suitable as a nuclear fuel material, from its natural concentration of about 0.7% to a concentration of 3% required in the reactor.

In contradistinction thereto, isotope separation by selective enrichment by means of lasers offers the possibility of realizing sufficient enrichment in one or a few stages. In principle, such isotope separation can be based on the atoms of the respective element or on molecules formed from these atoms. After the selective enrichment, the excited atoms or molecules can be separated from the nonexcited molecules by various types of physical or chemical processes.

Isotope separation with the aid of lasers has already been proposed and is performed, as disclosed in U.S. Pat. No. 3,443,087 to J. Robieux and J. M. Auclair, by selectively exciting $U^{235}$ molecules with laser radiation in a vacuum chamber filled, for example, with $UF_6$ gas, then ionizing these molecules by irradiation with ultraviolet light, and thereafter deflecting the ionized molecules out of the gas by means of electric or magnetic fields.

This creates the difficulty, however, that the first step of selective excitation requires a comparatively very small amount of energy, amounting to only 0.06 eV to 0.2 eV, and that the ionization energy required for the second step does not have a precisely defined value. This is explained by the fact that the energy introduced is utilized not only for ionization but distributes itself to many energy levels of the molecule and may also effect dissociation. By irradiating with monochromatic ultraviolet light, even with selection of the most favorable wavelength, not only the excited molecules but, to a considerable extent, also the non-excited molecules of the other type of isotope are ionized. To reduce this difficulty, the excitation has to be effected in several stages and this involves great losses of laser energy and correspondingly a great amount of apparatus.

According to another known isotope separation process involving selective excitation with lasers are described in German Offenlegungsschrift [Laid-Open Application] No. 1,959,767, by K. Gurs, the molecules, e.g. $UF_6$ are excited isotope-specifically in their vibration rotation spectra and are then chemically converted in a suitable reaction mixture. Due to the excitation, the activation energy required for the chemical reaction is reduced and the reaction speed is increased under certain conditions by the Boltzmann factor $e^{\Delta E/kT}$, where $\Delta E$ constitutes the quantum energy introduced. For quanta of the $CO_2$ laser, the Boltzmann factor has a value of 100 at room temperature ($T= 300$ K).

Both above-mentioned isotope separation processes employing lasers required as a first step a selective excitation of the molecules. This is possible only, due to the great width of the vibration rotation bands relative to the isotope shift, if the bands are separated into individual vibration rotation lines. However, even at low pressure the individual lines will overlap to a greater or lesser degree depending on temperature and wavelength so that simultaneously with the molecules of the desired type of isotopes other molecules are always excited along. It is not possible to lower the temperature much below room temperature because otherwise the $UF_6$ gas would freeze practically completely and thus the quantity of gas to be converted during isotope separation in the process would not be sufficient. Due to the incomplete separation of the vibration rotation lines the efficiency of the last described process of isotope separation based on selective excitation of the molecules and subsequent chemical reaction of the excited molecules is also limited, the separation factor being reduced.

It has also been suggested that it may be possible to base the isotope separation with lasers on uranium atoms, this being disclosed in German Offenlegungsschrift No. 2,312,194, by J. Nebenzahl and M. Levin and German Offenlegungsschrift No. 2,353,002, by R. Levy and G.S. Janes. These processes include a multistage photoionization of uranium atoms. In this process uranium vapor is produced and this vapor is irradiated by a tunable narrowband dye laser and a further light source. The quantum energy of the dye laser and of the additional light source are less than the ionization energy of the uranium atoms; however their sum is greater than the uranium atom ionization energy.

The wavelength of the dye laser must be selected so that only the $U^{235}$ isotope is excited. If such an excited atom absorbs a quantum of the second light source, it is ionized. Since such ionization is isotope-specific, the separation of the isotopes can be effected by deflecting the ions in an electric or magnetic field.

Due to the short life time of the level excited in the first stage and the low possibility of transition to the ionization continuum, the quantum yield for photoionization is low. Since furthermore the efficiency of the required light sources, i.e., the dye laser and high pressure lamps, is also low, it is not possible with such process to realize a substantial reduction of the energy requirement compared to the gas centrifuge process already in use. There is the added drawback that the uranium must be present in its vapor phase. The high temperature of more than 2300° C required for this conversion already produces great technical difficulties. No material is known at this time which is chemically resistant to uranium metal at such high temperatures.

SUMMARY OF THE INVENTION

It is therefore an object of the present invention to overcome the above-described drawbacks of the known separation processes and to fully utilize the potentialities provided in the separation of isotopes with the aid of laser light. A further object of the invention is to considerably reduce the cost of the separation procedure.

The invention is based essentially on the discovery that such separation can be accomplished in a surprisingly simple manner, in a procedure involving laser radiation excitation, by forming the molecular gas into a stream, undercooling the stream by adiabatic expansion in a nozzle, and exciting the molecules of this gas stream with the aid of a laser.

The temperature can here be set so that, both, separation of the molecular lines is sufficient for selective excitation of the molecules and the difference in reaction speed between the excited and nonexcited molecules is sufficient for chemical separation. The process according to the invention is extremely well suited, inter alia, for the separation of the uranium isotopes $U^{235}$ and $U^{238}$.

According to an advantageous embodiment of the invention, the edge regions of the undercooled gas stream are peeled off with the aid of baffles so that the width of the velocity distribution and the Doppler width of the absorption lines are reduced.

It has moreover been found to be advantageous to design the nozzle and to select the expansion ratio so that the gas stream will have as low a temperature as possible with strong cooling of the internal degrees of freedom of the molecules, rotation and vibration, without producing annoying condensation, i.e., dimer formation.

According to the invention an additional gas with a high adiabatic coefficient $H = C_p/C_v$ can also be added to the molecular gas if the latter is $UF_6$, for example, to produce better cooling and simultaneous suppression of condensation, i.e., dimer formation. A noble gas is particularly suitable as such additional gas.

According to an advantageous embodiment of the method of the invention, the problem of tuning a given laser line to a suitable absorption line is solved by utilizing the Doppler effect. By adapting the speed of the gas stream and by aligning the laser beam relative to the gas stream the Doppler shift of the absorption spectrum of the molecular gas is adjusted so that absorption is effected substantially only by the molecules of the isotope type to be separated. On the other hand, it is also possible to adjust the wavelength of the laser with the aid of an optoacoustical modulator* to a value which is favorable for selective absorption.

* see for instance C. F. Quate, C. D. W. Wilkinson, and D. K. Winslow, Proc. IEEE 53 (1965) 1604 – 1623

If the molecular gas employed in the process of the invention is $UF_6$, then the selective excitation will advantageously be effected either with a hydrogen halide laser, such as an HF, DG or HCl laser, or a laser of a type which operates with a gaseous carbon compound, such as CO, COS or $CS_2$ as the laser active material.

According to the preferred embodiment of the invention the excited molecules are separated by chemical conversion. For this purpose the reactant for the chemical conversion may be introduced by the addition of a further gas stream to the undercooled gas stream containing the molecules to be excited. On the other hand, the gas stream which contains the molecules to be excited can also be introduced into a gas dynamic condenser containing the reactant for the chemical conversion. If the gas stream is not to spread out freely but is introduced through a tube, the reactant can be introduced into the gas stream via nozzles.

If $UF_6$ is used as the molecular gas, use can be made according to a further feature of the invention, of ammonia, hydrogen chloride or hydrogen bromide as the reactant for the chemical conversion of this molecular gas. The reaction products resulting from the chemical conversion can then be separated according to a conventional process, advantageously by fractional condensation.

According to another embodiment of the method of the invention, the molecules containing the isotopes to be separated are selectively dissociated in the undercooled gas stream in two or more stages by optical excitation.

It is also possible, within the scope of the invention, to selectively ionize the molecules containing the isotope in question in the undercooled gas stream by optical excitation in two or more stages. In this case the ionized molecules can then be separated from the gas stream by the application of an electric or magnetic field.

Further features, advantages and possible applications of the present invention will become evident from the following description of a preferred embodiment of the invention.

DESCRIPTION OF THE PREFERRED EMBODIMENTS

Figure 1:
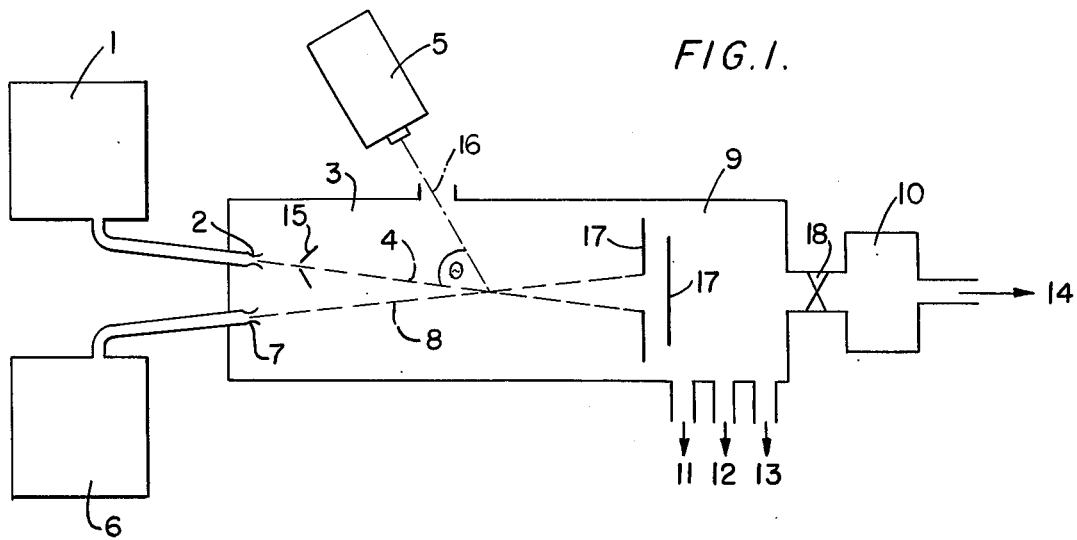
FIG. 1 is a schematic representation of an apparatus for carrying out the invention.

In the apparatus for practicing the method of the invention illustrated in the FIG. 1, $UF_6$ gas or a mixture containing this $UF_6$ gas and an additional gas, is permitted to escape from a vessel 1 at relatively high pressure through a nozzle 2, while undergoing adiabatic expansion, into a region 3 at lower pressure.

According to this embodiment, the diameter of the gas stream 4 is delimited by means of a baffle 15. This produces an undercooled supersonic gas stream 4 in which the molecules have a substantially uniform translational speed.

A hydrogen halide laser 5 serves to produce the selective excitation. The laser emits at a pure rotation transition of a vibration state. The resulting laser beam 16 impinges on the undercooled gas stream 4 at an angle $\theta$. Absorption takes place in the region of the $\nu_3$ vibration band of the $UF_6$ molecule. The angle $\theta$, the speed of the gas stream and the pressure in region 3 are selected so that, under consideration of the occurring Doppler shift, only the molecules $U^{235}F_6$ are excited at a fixed laser emission frequency.

In the present embodiment of the invention, a second supersonic gas stream 8 is produced by passing a gas containing the reactant, e.g., ammonia ($NH_3$) through a further nozzle 7. This gas stream 8 is also delimited by a baffle and impinges on the undercooled gas stream 4 while forming a narrow angle therewith. The parameters controlling the two streams are selected so that only a slight but defined relative speed exists between the two. The two gas streams and the laser beam 16 need not lie in the same plane in this case.

Without laser excitation, the reactant would react only insignificantly with the $UF_6$. However, under the effect of the laser radiation, the reaction rate for the excited molecules is increased considerably. Thus, in the described arrangement the reaction product is enriched with respect to the $U^{235}$ isotope.

The process of the invention can be practiced continuously with the apparatus shown in the FIG. In order to maintain a low pressure in region 3, the quantity of gas developed in this embodiment is sucked out by means of vacuum pumps 10 through a fractional condensation system 9 which consists of a combination of cryogenic baffles 17. In this system 9 the reaction product, which here consists substantially of $UF_4$, is separated and the unconverted quantity of gas is again divided into its components. The respective components are discharged through outlets 11, 12, 13 and 14. The unconverted components here in the form of impoverished $UF_6$, are compressed and introduced into storage vessels or returned to vessels 1 and 6. The reaction product can be reconverted to $UF_6$ if required and introduced into a further separation stage.

The separation process according to the invention, in which a laser beam is used for the selective excitation of the molecules and is directed onto an undercooled stream of molecular gas, thus has the significant advantage, for economical utilization of the process, that continuous operation is possible and that with this process a high throughput is realized even under the conditions required for laser excitation.

It is furthermore of significance that during the adiabatic expansion of the molecular gas, e.g. the $UF_6$ gas, in the nozzle the majority of the unoriented translation energy and of the internal energy is converted to directed movement energy in the gas stream 4. The average speed of the molecules thus becomes high, while the speed distribution becomes low. This means a reduction of the translation temperature compared to the starting temperature.

Since at the low background pressure in volume 3, the line width is determined by the Doppler effect, the Doppler width is thus correspondingly reduced due to the narrow velocity distribution in the stream. By suitable selection of the stream parameters and by cutting out the edge zones of the gas stream 4 with the aid of baffles 15 it is possible to reduce the velocity distribution to such an extent that the Doppler width is only a fraction of its original value.

Due to the high moment of inertia and the low lying normal frequencies, many of the rotation and vibration levels in the $UF_6$ molecule are already occupied at room temperature. Thus, for example, the rotation level with the quantum number $J=100$ still has about one third of the maximum occupation which at this temperature is at $J = 60$. According to the Boltzmann statistics, the population number of the high energy levels is reduced according to the relaxation rates upon a reduction in temperature and that of the lower levels is increased accordingly. Compared to a stationary gas at room temperature, the absorption bands in the undercooled gas stream consist only of a few lines which furthermore have a greater intensity and lower half width. The excitation of one type of isotope can thus be effected, according to the invention, with the required selectively which is much higher than that of the known methods.

The excitation of molecular vibrations reduces the activation energy for a chemical reaction by an amount $\Delta E$. The increase in reaction speed by the factor $e^{\Delta E/kT}$ associated therewith is very much dependent on temperature; it may be many orders of magnitude. Thus the selectivity of the chemical reaction controlled by the laser excitation becomes greater at lower temperatures.

The above-described gas stream technique offers the possibility to achieve spectral coincidence of emission lines of favorable molecular lasers and suitable absorption lines of the $UF_6$ molecule. Due to the Doppler effect the absorption frequencies of the molecules shift in the gas stream 4. The decisive factor is the speed component of this gas stream 4 parallel to the direction of laser beam 16. By changing the angle between the gas stream and the laser beam and/or by suitable selection of the stream speed it is possible, without in principle limiting the realizable cooling, to effect overlapping of laser and absorption frequencies over wide limits. The matching range is determined according to $$\Delta \nu = \pm \frac{V}{c} \nu,$$

by the maximum speed $V$ of the gas stream, where $\nu$ is the transition frequency and $c$ is the velocity of light.

As already mentioned, according to one advantageous embodiment of the process of the invention, one or a plurality of additional gases are added to the molecular gas, e.g. the $UF_6$ gas, and the undercooled gas stream 4 is produced from this gas mixture. Additional gases can advantageously influence the process in many ways. The addition of noble gases results in a particularly low translation temperature and thus a particularly low Doppler width. Helium or other light gases, e.g. $H_2$, accelerate the vibration relaxation and thus permit heavy substantial cooling of the vibration degrees of freedom. The addition of xenon, however, reduced vibration relaxation and, as a result of the dilution effect, likewise the energy transfer from $U^{235}F_6$ to $U^{238}F_6$. Moreover, the use of additional gases also permits the suppression of condensation of $UF_6$, i.e., dimer formation in the undercooled gas stream 4.

Various lasers can be used to excite the $UF_6$ gas. In the range of the $\nu_3$ band the excitation can be effected with some hydrogen halide, e.g., HCl, HF, lasers. A CO laser may be used for the combination bands $3\nu_3$, $2\nu_2 + \nu_3$ and $\nu_1 + \nu_2 + \nu_3$, while for the bands $(\nu_1 + \nu_4)$ and $(\nu_2 + \nu_3)$ there is available a $CS_2$ laser or a COS laser, respectively.

The process of the invention can also employ other chemical substances, such as, for example, HBr or HCl, as the reactants. The selection of the reactant is determined substantially by the temperature produced in the gas stream 4 since advantageous use is made of chemical conversions in which the reaction will not take place too rapidly in the absence of laser excitation but with excitation the conversion of the excited molecules is as complete as possible.

According to a further embodiment (FIG. 2) of the process of the invention, it is possible to eliminate the second gas stream 8 which contains the reactant. In this case the $UF_6$ stream is introduced into a gas-dynamic condenser 18 which contains the reactant.

Among the chemical reactions which are induced by laser excitation are also decomposition reactions in which the excited molecules dissociate. Since absorption of quanta in the range of the vibration-rotation lines only very rarely directly produces dissociation, further energy is introduced by irradiation with short wavelength light. Whereas the energy introduced in the second excitation stage by itself must be less than the dissociation energy, the total energy of both excitation processes should reach or exceed the dissociation limit.

The process of the invention in which the molecules are excited in an undercooled gas stream not only yields advantages with respect to excitation in the range of the vibration-rotation lines but also permits, in conjunction with the method of multiple excitation and dissociation, a more precise definition of the quantum energy of the radiation for the second excitation stage in the direction of better selectivity. In this embodiment the process results in a significant improvement over the method utilized by Ambartsumyan et al., disclosed in the article by R.V. Ambartsumyan, V.S. Letokhov, G.N. Makarov, A.A. Puretskii, in ZhETF Pis. Red. 17, 2 at pages 91–94, for the separation of nitrogen isotopes and makes possible its use for the separation of uranium.

One specific embodiment of the invention is described in the following (FIG. 1):

A mixture containing 60% xenon, 20% helium and 40% $UF_6$ is permitted to escape from vessel 1 through the nozzle 2, while undergoing adiabatic expansion into the region 3. Pressure and temperature in vessel 1 are kept at $p = 2000$ Torr respectively $T = 200°$ C.

A small hole with 0.05 mm diameter in a 0.2 mm thick monel plate forms the nozzle 2. The background pressure in volume 3 is below $10^{-2}$ Torr. In this way a supersonic gas stream is created whose center part penetrates the 2 mm opening of the baffle 15.

This undercooled gas stream 4 is irradiated by the continuous HF laser 5 operating at the pure rotational line 16 – 15 of the vibrational ground state. The laser frequency is stabilized to better than 1 MHz. By changing the angle $\theta$ between the laser beam 16 and the gas stream 14 the overlapping of laser and absorption frequencies can be effected over the range $\Delta\nu=\pm 17$ MHz.

Since the proper angle depends on the frequency of the laser 5 and on the velocity of the gas stream and hence on the composition, the temperature, and the pressure of the gas in vessel 1, the size and shape of the nozzle 2, the background pressure in volume 3 the value $\theta$ for optimal excitation of the rare isotope $U^{235}$ has to be adjusted according to the actual operating conditions.

In the present embodiment a second supersonic gas stream 8 is produced by passing ammonia ($NH_3$) through a further nozzle 7. The nozzle is similar to nozzle 2 but its opening has the diameter 0.2 mm. The vessel 6 has room temperature and the pressure of ammonia in it is 5000 Torr.

This gas stream impinges on the stream 4 at an angle of about 2°.

Under the effect of laser irradiation reaction occurs in the mixing region of the streams. If the angle $\theta$ is chosen in such a way that laser excitation is selective for $U^{235}$ the reaction product is enriched with respect to this isotope.

The reaction product, mainly $UF_4$, is frozen out at the cooled walls of the vessel 3 and at the cryogenic baffle 17. Since the temperature at baffle 17 is $T = -150°$ C the unconverted $UF_6$ and the carrier gas xenon is also trapped.

The remaining mixture of ammonia and helium is sucked out by means of vacuum pumps 10 and discharged through outlet 14. To recover the enriched product the gas streams 4 and 8 are shut off and the valve 18 is closed. The cryogenic baffle 17 is than slowly warmed up. Due to the differences in vapour pressure xenon is first discharged and sampled at outlet 11. At about room temperature the impoverished $UF_6$ is discharged and sampled (outlet 12). Finally the remaining reaction product is removed by reconverting it to $UF_6$. This enriched $UF_6$ is sampled at outlet 13.

Figure 2:
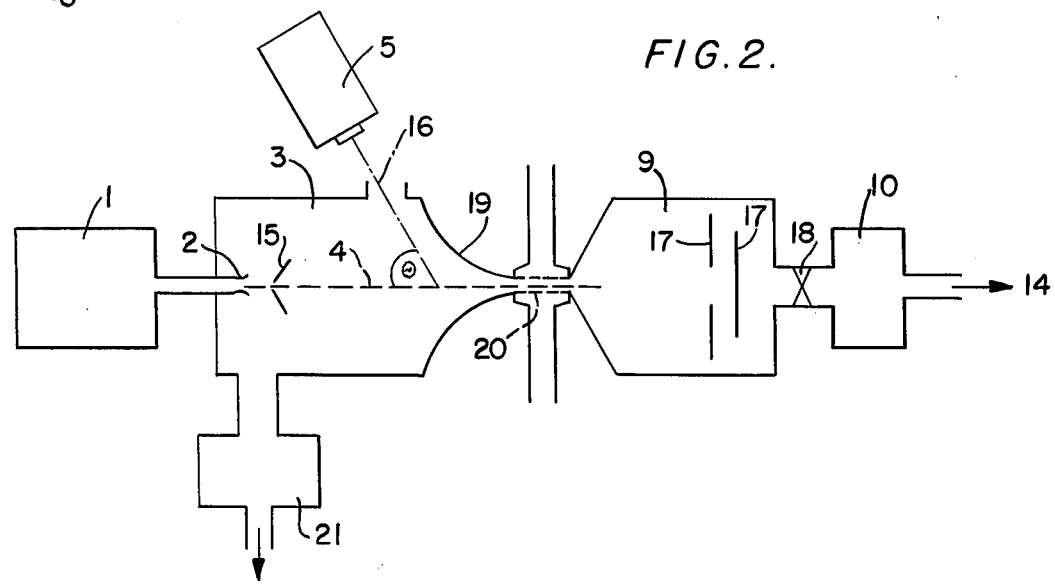
FIG. 2 represents a further embodiment with a gas dynamic condenser.

FIG. 2 shows another preferred embodiment:

In this embodiment the excited gas stream 4 enters a gas dynamic condenser 19 in which the gas stream is slowed down and the static pressure gradually increased. The condenser 19 is formed by a reversed Laval-nozzle connected to the fractional condensation system 9.

The reactant, e.g. ammonia ($NH_3$), is injected at the throat of the Laval-nozzle by an array of small orifices 20. In this embodiment the gas stream 7 is not required. Therefore there is practically no reactant present in volume 3 and the vacuum system 21 pumps only the constituents of which the gas stream 4 is formed. After compression they can be directly recycled to vessel 1.

Also the condensation system 9 can be used as a reaction vessel. In this case it contains the reactant, e.g. ammonia ($NH_3$), at a pressure of 1–10 Torr and the gas stream 4 enters the volume 9 via the gas dynamic condenser 19.

Figure 3:
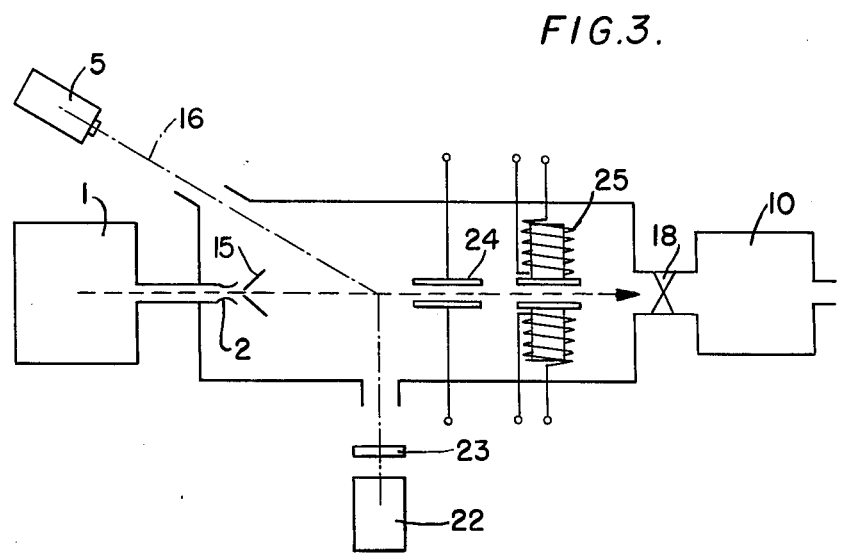
FIG. 3 illustrates a further embodiment with multiple optical excitation.

FIG. 3 shows another preferred embodiment wherein the gas stream technique is used to enable selective excitation of the molecules and where these molecules are further excited in a second step by visible or ultraviolet radiation leading to dissociation or ionization.

As described by Ambartsumyan et al. respectively Robieux et Auclaire an intensive broadband lightsource 22 with appropriate filters 23, as well as a tunable laser can be used for the second excitation step.

In the case of ionization the rare isotope can be extracted from the gas stream 4 by deflection in an electric 24 or magnetic 15 field or in a combination of both.

It will be understood that the above description of the present invention is susceptible to various modifications, changes and adaptations, and the same are intended to be comprehended within the meaning and range of equivalents of the appended claims.

What is claimed is:

1. Method for separating the different isotopes of an element having a plurality of isotopes, by forming a gas from isotopic compounds of the element, selectively exciting the molecules of one isotopic compound of the gas by applying laser radiation thereto, and separating the excited molecules by physical or chemical means, wherein prior to laser excitation such gas is conducted through a nozzle to cause it to undergo adiabatic expansion to form an undercooled gas stream, and the step of exciting the molecules involves applying laser radiation to the gas stream.

2. Method as defined in claim 1 wherein the step of forming the gas stream further includes stripping the edge regions of the undercooled gas stream away from the central portion thereof with the aid of baffles.

3. Method as defined in claim 1 wherein the nozzle is formed, and the expansion ratio is selected, for causing the temperature in the gas stream to be as low as possible and for producing substantial cooling of the inner degrees of freedom of the molecules while preventing annoying condensation and attendant dimer formation.

4. Method as defined in claim 1 wherein the isotopic compound gas is mixed with an additional gas.

5. Method as defined in claim 4 wherein the additional gas is a gas which has a high adiabatic coefficient, $H = C_p/C_v$, and thus produces increased cooling of the molecular gas in the gas stream with simultaneous suppression of condensation and dimer formation.

6. Method as defined in claim 5 wherein the additional gas is a noble gas.

7. Method as defined in claim 1 wherein the gas stream is given a selected velocity and said step of applying laser radiation includes orienting the laser radiation beam relative to the gas stream in a manner to shift the absorption spectrum of the gas in frequency as a result of the Doppler effect in a manner to cause substantially only molecules of the one isotopic compound to experience energy absorption.

8. Method as defined in claim 1 wherein said step of applying laser radiation is carried out by means of a laser with fixed emmission frequency and includes influencing the laser radiation by an optoacoustic modulator to set the wavelength of such radiation to a value favorable for selective energy absorption by the molecules of the one isotopic compound.

9. Method as defined in claim 1 wherein the isotopic compound gas is $UF_6$ and the laser radiation is produced by a hydrogen halide laser.

10. Method as defined in claim 9 wherein the laser is an HF laser.

11. Method as defined in claim 9 wherein the laser is an HCl laser.

12. Method as defined in claim 1 wherein the isotopic compound gas is $UF_6$ and the laser radiation is produced by a laser which operates with a gaseous compound of carbon as the laser active material.

13. Method as defined in claim 12 wherein the laser active material is CO, COS or $CS_2$.

14. Method as defined in claim 1 wherein the step of separating the excited molecules is effected by chemical conversion and includes providing a reactant for the chemical conversion by introducing a further gas stream containing such reactant into the isotopic compound gas stream.

15. Method as defined in claim 14 wherein the isotopic compound gas is $UF_6$ and the reactant is $NH_3$, HCl, or HBr.

16. Method as defined in claim 14 wherein the step of separating further includes subjecting the reaction products to fractional condensation to effect separation thereof.

17. Method as defined in claim 1 wherein the step of separating the excited molecules is effected by chemical conversion and includes introducing the undercooled gas stream into a gas-dynamic condenser containing the reactant for the chemical conversion.

18. Method as defined in claim 17 wherein the isotopic compound gas is $UF_6$ and the reactant is $NH_3$, HCl, or HBr.

19. Method as defined in claim 17 wherein the step of separating further includes subjecting the reaction products to fractional condensation to effect separation thereof.

20. Method as defined in claim 1 wherein the step of separating is carried by subjecting the gas stream, after selective excitation, to a plurality of optical excitation steps for selectively dissociating the molecules of the one isotopic compound.

21. Method as defined in claim 1 wherein the step of separating is carried out by subjecting the gas stream, after selective excitation, to a plurality of optical excitation steps for selectively ionizing the molecules of the one isotopic compound.

22. Method as defined in claim 21 further comprising separating the ionized molecules from the gas stream by the application of an electric field.

23. Method as defined in claim 21 further comprising separating the ionized molecules from the gas stream by the application of a magnetic field.

* * * * *

Notice of Adverse Decision in Interference

In Interference No. 100,012, involving Patent No. 4,025,790, H. L. Jetter, K. Gurs, and W. Englisch, METHOD FOR SEPARATING ISOTOPES BY MEANS OF LASERS, final judgment adverse to the patentees was rendered Apr. 13, 1979, as to claims 1, 3 through 6, 14, and 20 through 23.

[*Official Gazette September 4, 1979.*]